(12) United States Patent
Liu

(10) Patent No.: US 11,833,426 B2
(45) Date of Patent: Dec. 5, 2023

(54) VIRTUAL OBJECT CONTROL METHOD AND RELATED APPARATUS

(71) Applicant: TENCENT TECHNOLOGY (SHENZHEN) COMPANY LIMITED, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 132 days.

(21) Appl. No.: 17/408,362

(22) Filed: Aug. 20, 2021

(65) Prior Publication Data
US 2021/0379491 A1 Dec. 9, 2021

Related U.S. Application Data

(63) Continuation of application No. PCT/CN2020/103033, filed on Jul. 20, 2020.

(30) Foreign Application Priority Data

Aug. 30, 2019 (CN) .......................... 201910812631.6

(51) Int. Cl.
*A63F 13/537* (2014.01)
*A63F 13/56* (2014.01)

(52) U.S. Cl.
CPC ............ *A63F 13/537* (2014.09); *A63F 13/56* (2014.09)

(58) Field of Classification Search
CPC .................................. A63F 13/537; A63F 13/56
See application file for complete search history.

(56) References Cited

U.S. PATENT DOCUMENTS

| | | | | |
|---|---|---|---|---|
| 9,348,488 | B1* | 5/2016 | Renema, II | G06F 3/04817 |
| 9,952,755 | B2* | 4/2018 | Ogiso | G06F 3/04845 |
| 10,180,714 | B1* | 1/2019 | Kin | G06F 3/04883 |
| 10,603,589 | B2* | 3/2020 | Miyamoto | A63F 13/56 |
| 2009/0143141 | A1* | 6/2009 | Wells | G07F 17/3239 463/37 |

(Continued)

FOREIGN PATENT DOCUMENTS

| | | |
|---|---|---|
| CN | 103252087 A | 8/2013 |
| CN | 105446525 A | 3/2016 |

(Continued)

OTHER PUBLICATIONS

Adam Savage, "Quick Look at the Joystick—It iPad Arcade Stick", 2011, Youtube.com, pp. 1-2, at https://www.youtube.com/watch?v=IWwzIS7erYA (last visited Apr. 4, 2023). (Year: 2011).*

(Continued)

*Primary Examiner* — Steve Rowland
(74) *Attorney, Agent, or Firm* — ANOVA LAW GROUP PLLC

(57) ABSTRACT

A virtual object control method is provided. The method includes: displaying a user interface (UI), the UI including a joystick control configured to control a virtual object to move; receiving a quick click/tap operation signal acting on a target region corresponding to the joystick control; and controlling, according to the quick click/tap operation signal, the virtual object to run in a virtual scene displayed in the UI.

18 Claims, 13 Drawing Sheets

(56) References Cited

U.S. PATENT DOCUMENTS

| | | | | |
|---|---|---|---|---|
| 2010/0045667 | A1* | 2/2010 | Kornmann | G06T 19/003 |
| | | | | 345/158 |
| 2013/0217498 | A1 | 8/2013 | Wang | |
| 2015/0182856 | A1* | 7/2015 | Mays, III | G06F 3/0488 |
| | | | | 463/31 |
| 2015/0258430 | A1* | 9/2015 | Alexeev | A63F 13/40 |
| | | | | 463/36 |
| 2017/0182407 | A1* | 6/2017 | Steele | A63F 13/803 |
| 2018/0024660 | A1* | 1/2018 | Wang | G06F 3/0484 |
| | | | | 273/110 |
| 2018/0164801 | A1* | 6/2018 | Kim | G05D 1/0033 |
| 2019/0046878 | A1* | 2/2019 | Howard | A63F 13/426 |
| 2019/0099669 | A1 | 4/2019 | Miao | |
| 2019/0126148 | A1* | 5/2019 | Wei | A63F 13/2145 |
| 2020/0188774 | A1* | 6/2020 | Fung | A63F 13/235 |
| 2020/0282308 | A1 | 9/2020 | Guo et al. | |
| 2021/0339151 | A1* | 11/2021 | Stafford | A63F 13/213 |
| 2021/0379491 | A1* | 12/2021 | Liu | A63F 13/537 |
| 2023/0078466 | A1* | 3/2023 | Lu | A63F 13/426 |

FOREIGN PATENT DOCUMENTS

| | | |
|---|---|---|
| CN | 105582670 A | 5/2016 |
| CN | 107754309 A | 3/2018 |
| CN | 107930105 A | 4/2018 |
| CN | 108379844 A | 8/2018 |
| CN | 108469943 A | 8/2018 |
| CN | 108509139 A | 9/2018 |
| CN | 110523085 A | 12/2019 |
| JP | 201967390 A | 4/2019 |

OTHER PUBLICATIONS

The World Intellectual Property Organization (WIPO) International Search Report for PCT/CN2020/103033 dated Oct. 21, 2020 6 Pages (including translation).

The State Intellectual Property Office of the People's Republic of China (SIPO) Office Action 1 for 2019108126316 dated Apr. 2, 2020 7 Pages (including translation).

The Japan Patent Office (JPO) Notification of Reasons for Refusal for Application No. 2021-558011 and Translation dated Oct. 18, 2022 9 Pages.

The Japan Patent Office (JPO) Decision of Refusal for Application No. 2021-558011 and Translation datedJun. 5, 2022 5 Pages.

Seiichi Kuranishi , Monster Hunter G, Electric Shock DS & Wii, Japan, ASCII Media Works, Jan. 1, 2009, vol. 9, pp. 6-33 (Document which is newly cited; Documents showing well-known arts) 05.

* cited by examiner (a)

(b)

VIRTUAL OBJECT CONTROL METHOD AND RELATED APPARATUS

RELATED APPLICATION(S)

This application is a continuation application of PCT Patent Application No. PCT/CN2020/103033 filed on Jul. 20, 2020, which claims priority to Chinese Patent Application No. 201910812631.6, entitled "VIRTUAL OBJECT CONTROL METHOD AND APPARATUS, TERMINAL, AND STORAGE MEDIUM" and filed with the National Intellectual Property Administration, PRC on Aug. 30, 2019, all of which are incorporated herein by reference in entirety.

FIELD OF THE TECHNOLOGY

Embodiments of the present disclosure relates to the field of computer and Internet technologies, and in particular, to control of a virtual object.

BACKGROUND

Regarding certain shooter games (STGs), at a mobile side, a player may control a virtual object in a game scene provided in a game battle, for example, may control the virtual object to move.

According to certain technologies, a user interface (UI) of an STG is provided with a button used for controlling a virtual object to move. A user may control, by operating the button, the virtual object to move, for example, control the virtual object to move in a direction in a virtual scene.

SUMMARY

Certain embodiments of the present disclosure provide a virtual object control method and a related apparatus, to simplify technical operations and to deliver greater operation efficiencies associated with controlling a virtual object to move.

In one aspect, the present disclosure provides a virtual object control method, the method including: displaying a UI, the UI including a joystick control configured to control a virtual object to move; receiving a quick click/tap operation signal acting on a target region corresponding to the joystick control; and controlling, according to the quick click/tap operation signal, the virtual object to run in a virtual scene displayed in the UI.

In another aspect, the present disclosure provides a virtual object control apparatus, the apparatus including: a memory storing computer program instructions; and a processor coupled to the memory and configured to execute the computer program instructions and perform: displaying a user interface (UI), the UI including a joystick control configured to control a virtual object to move; receiving a quick click/tap operation signal acting on a target region corresponding to the joystick control; and controlling, according to the quick click/tap operation signal, the virtual object to run in a virtual scene displayed in the UI.

In yet another aspect, the present disclosure provides a non-transitory computer-readable storage medium, the non-transitory computer-readable storage medium storing computer program instructions executable by at least one processor to perform: displaying a user interface (UI), the UI including a joystick control configured to control a virtual object to move; receiving a quick click/tap operation signal acting on a target region corresponding to the joystick control; and controlling, according to the quick click/tap operation signal, the virtual object to run in a virtual scene displayed in the UI.

In yet another aspect, the present disclosure provides virtual object control method, the method including: displaying a UI, the UI including a joystick control configured to control a virtual object to move; controlling, when in response to determining the virtual object is in a non-standing state and a swipe operation signal whose initial position is at the joystick control is received, the virtual object to switch from the non-standing state to a standing state; and controlling, after the virtual object is switched to the standing state, the virtual object to run in a virtual scene displayed in the UI.

In yet another aspect, the present disclosure provides a virtual object control apparatus, the apparatus including: an interface display module, configured to display a UI, the UI including a joystick control configured to control a virtual object to move; a signal receiving module, configured to receive a quick click/tap operation signal acting on a target region corresponding to the joystick control; and a running control module, configured to control, according to the quick click/tap operation signal, the virtual object to run in a virtual scene displayed in the UI.

According to the technical solutions provided in the embodiments of the present disclosure, a joystick control is displayed in a UI; and when in response to determining a quick click/tap operation signal acting on a target region corresponding to the joystick control is received, a virtual object is controlled to run in a virtual environment displayed in the UI, triggering a virtual object to automatically run with one key without requiring the user to continuously click/tap or long press an operation control, thereby improving the operation efficiency.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
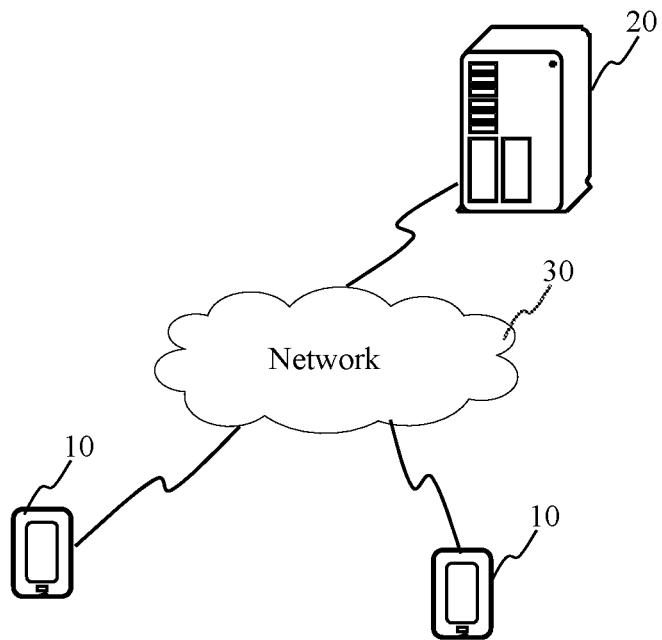
FIG. 1 is a schematic diagram of an implementation environment according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

In certain embodiments, a virtual scene refers to a scene displayed (or provided) when a client of an application (such as a game application) runs on a terminal. The virtual scene is a scene created for a virtual object to perform activities (such as game competition). The virtual scene may be, for example, a virtual house, a virtual island, or a virtual map. The virtual scene may be a simulated scene of the real world, or may be a semi-simulated semi-fictional scene, or may be an entirely fictional scene. The virtual scene may be a two-dimensional virtual scene, a 2.5-dimensional virtual scene, or a three-dimensional virtual scene, which is not limited in the embodiments of the present disclosure.

In certain embodiments, a virtual object refers to a virtual character controlled by a user account in an application. For example, the application is a game application. The virtual object is a game character controlled by the user account in the game application. The virtual object may be in a human form or animal, cartoon, or other forms, which is not limited in the embodiments of the present disclosure. The virtual object may be presented in a three-dimensional form or a two-dimensional form, which is not limited in the embodiments of the present disclosure.

In different game applications, operations that can be performed by the virtual object controlled by the user account may be different. For example, in an STG application, the user account may control the virtual object to perform operations such as shooting, running, jumping, gun picking up, gun replacing, and bullet loading.

In certain embodiments, in addition to the game applications, the virtual object may also be presented to a user and provided with a corresponding function in applications of another type, for example, an augmented reality (AR) application, a social application, or an interactive entertainment application, which is not limited in the embodiments of the present disclosure. Besides, the form and corresponding function of the virtual object vary with different applications, and may be preset according to an actual requirement, which is not limited in the embodiments of the present disclosure.

FIG. 1 is a schematic diagram of an implementation environment according to an embodiment of the present disclosure. The implementation environment may include a mobile terminal 10 and a server 20.

The mobile terminal 10 may be a portable electronic device, such as a mobile phone, a tablet computer, a game console, an ebook reader, a multimedia playback device, and a wearable device. A client of a game application, such as a client of an STG application, may be installed in the mobile terminal 10.

The server 20 is configured to provide a backend service to the client of the application (for example, a game application) in the mobile terminal 10. For example, the server 20 may be a backend server of the application (for example, the game application). The server 20 may be one server, a server cluster including a plurality of servers, or a cloud computing service center.

The mobile terminal 10 and the server 20 may communicate with each other through a network 30. The network 30 may be a wired network or a wireless network.

Figure 2:
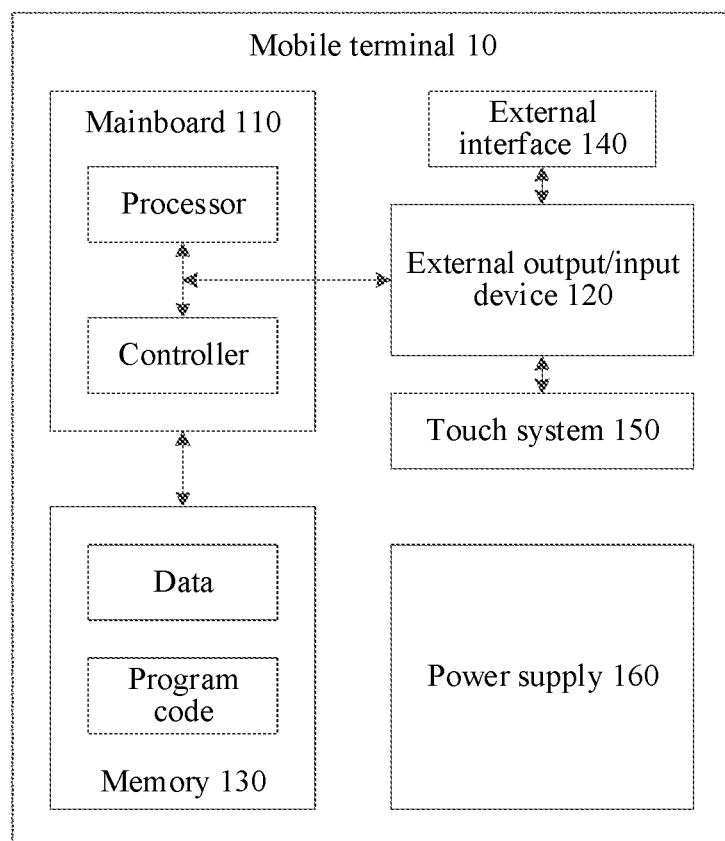
FIG. 2 is a schematic structural diagram of a terminal according to one or more embodiments of the present disclosure.

Steps in method embodiments of the present disclosure may be performed by the mobile terminal. FIG. 2 is a schematic structural diagram of a mobile terminal according to an embodiment of the present disclosure. The mobile terminal 10 may include a mainboard 110, an external output/input device 120, a memory 130, an external interface 140, a touch system 150, and a power supply 160.

Processing elements such as a processor and a controller are integrated in the mainboard 110.

The external output/input device 120 may include a display component (for example, a display screen), a sound playback component (for example, a speaker), a sound collecting component (for example, a microphone), and various buttons.

The memory 130 stores program code and data.

The external interface 140 may include an earphone interface, a charging interface, a data interface, and the like.

The touch system 150 may be integrated in the display component or the buttons of the external output/input device 120, and the touch system 150 is configured to detect touch operations performed by a user on the display component or the buttons.

The power supply 160 is configured to supply power to other components in the mobile terminal 10.

In this embodiment of the present disclosure, the processor in the mainboard 110 may generate a UI (for example, a game interface) by executing or calling the program code and the data stored in the memory, and present the generated UI (for example, the game interface) by using the external output/input device 120. During presentation of the UI (for example, the game interface), a touch operation performed during interaction between the user and the UI (for example, the game interface) may be detected through the touch system 150, and a response is made to the touch operation.

Figure 3:
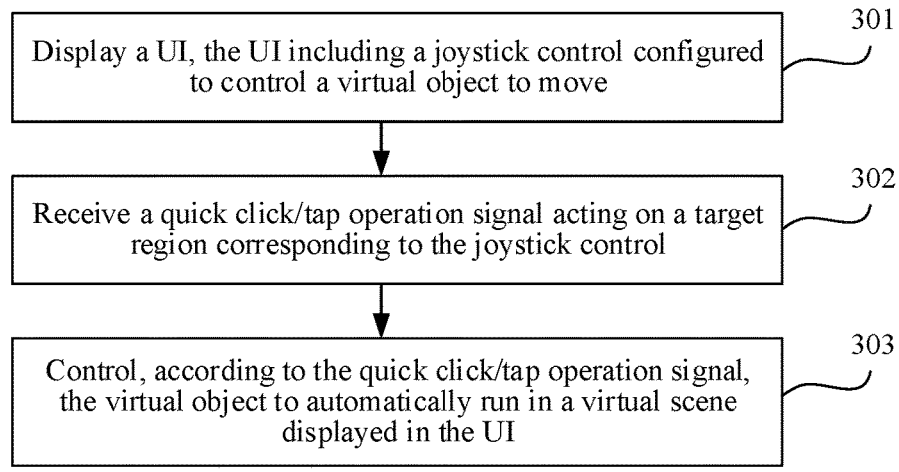
FIG. 3 is a schematic flowchart of a virtual object control method according to one or more embodiments of the present disclosure.

FIG. 3 is a flowchart of a virtual object control method according to an embodiment of the present disclosure. The method is applicable to the mobile terminal described above, such as a client of an application (for example, an STG application) in the mobile terminal. The method may include the following steps:

Step 301: Display a UI, the UI including a joystick control configured to control a virtual object to move.

Using an STG application as an example, the UI may be a display interface of a game battle. The UI is configured to present a virtual environment of the game battle to a user. For example, the UI may include an element, such as a virtual building, a virtual prop, or a virtual object, in the virtual environment. In certain embodiments, the UI further includes some operation controls, such as buttons, sliders, and icons, for the user to operate.

Figure 4:
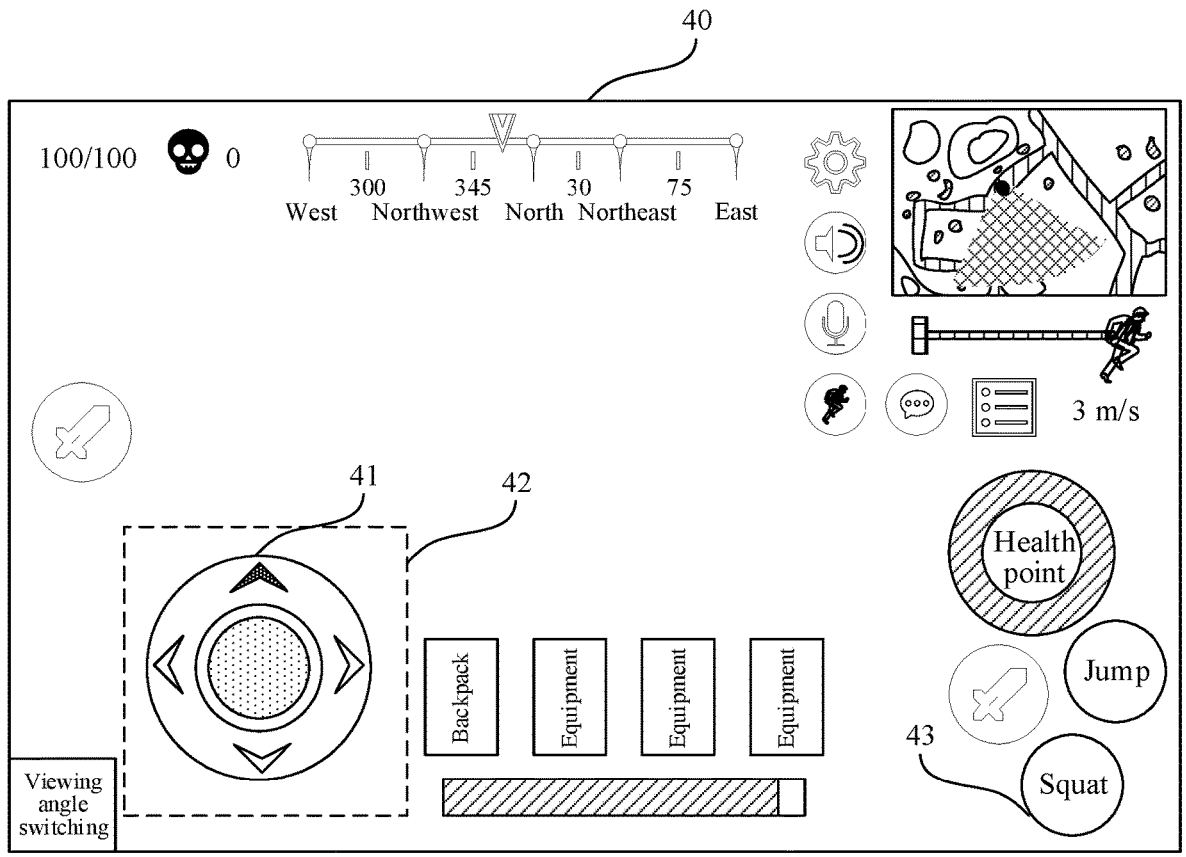
FIG. 4 is a schematic diagram of a UI according to one or more embodiments of the present disclosure.

In this embodiment of the present disclosure, as shown in FIG. 4, a UI 40 includes a joystick control 41, and the joystick control 41 is an operation control configured to control a virtual object to move. No display parameter of the joystick control 41 is limited in this embodiment of the present disclosure, that is, none of a shape, a size, a position, a style, and the like of the joystick control 41 is limited. For example, the joystick control 41 may be round or square. An area of the joystick control 41 may be 1/10 of an area of the UI 40, or may be 1/20 of the area of the UI 40. The joystick control 41 may be located at a lower left corner of the UI 40, or may be located at a lower right corner of the UI 40. The joystick control 41 may be displayed in a transparent form, or may be displayed in a color filled form. In this embodiment of the present disclosure, the display of the joystick control 41 does not block main display elements of the UI 40.

In certain embodiments, the UI includes a first view layer and a second view layer. A display level of the first view layer is higher than a display level of the second view layer. The joystick control is located at the first view layer, and a game picture used for displaying the virtual environment of the game battle is located at the second view layer. In certain embodiments, in addition to the joystick control described above, the first view layer may further include other operation controls, such as an operation control for controlling a posture of the virtual object, and an operation control for controlling virtual equipment assembled by the virtual object. This is not limited in this embodiment of the present disclosure.

Step 302: Receive a quick click/tap operation signal acting on a target region corresponding to the joystick control.

The target region corresponding to the joystick control is a region that overlaps with the joystick control. In the target region, the mobile terminal can respond to a touch operation of the user, for example, a click/tap or press operation. After the user performs the click/tap or press operation acting on the target region, the mobile terminal receives a corresponding operation signal.

In an example, the target region corresponding to the joystick control and the joystick control totally overlap with each other, that is, a size and shape of the target region corresponding to the joystick control are totally the same as a size and shape of the joystick control, and a center position of the joystick control and a center position of the target region overlap with each other.

In another example, the target region corresponding to the joystick control includes the joystick control, and a size of the target region corresponding to the joystick control is greater than a size of the joystick control. For example, as shown in FIG. 4, a target region 42 is a rectangular region with a size greater than a size of the joystick control 41. In certain embodiments, a center position of the joystick control and a center position of the target region overlap with each other.

In still another example, a size of the target region corresponding to the joystick control is less than a size of the joystick control. In certain embodiments, a center position of the joystick control and a center position of the target region overlap with each other.

In addition, the target region may be a region visible to the user in the UI, or may be a region invisible to the user in the UI. For example, the target region may be a transparent region. This is not limited in this embodiment of the present disclosure.

In this embodiment of the present disclosure, the quick click/tap operation signal is a signal generated by triggering of a plurality of consecutive click/tap operations, and in the plurality of consecutive click/tap operations, a time interval between two adjacent click/tap operations is less than a preset threshold. In certain embodiments, the quick click/tap operation signal may be a double-click/tap operation signal. The double-click/tap operation signal is an operation signal of two consecutive clicks/taps between which a time interval is less than a preset threshold. In certain embodiments, in other examples, the quick click/tap operation signal may be a triple-click/tap operation signal, a quadra-click/tap operation signal, or the like. This is not limited in this embodiment of the present disclosure.

Step 303: Control, according to the quick click/tap operation signal, the virtual object to automatically run in a virtual scene displayed in the UI.

In an example, when the quick click/tap operation signal is received, if the virtual object is in a standing state, the virtual object is controlled to automatically run in the virtual scene in the standing state.

In another example, when the quick click/tap operation signal is received, if the virtual object is in a non-standing state, the virtual object is controlled to automatically run in the virtual scene in the non-standing state.

In certain embodiments, to provide diversified virtual object control manners to the user and improve the man-machine interaction experience, after the foregoing step 303, the method further includes: receiving a posture switching instruction corresponding to the virtual object. The posture switching instruction is an operation instruction for controlling a posture of a virtual object to switch. The posture switching instruction may be triggered by the user through an operation control, a voice, or a gesture. If the virtual object is in a non-standing state, according to the posture switching instruction, the virtual object is controlled to switch from a non-standing state to a standing state, and then the virtual object is controlled to automatically run in the virtual scene in the standing state. If the virtual object is in a standing state, according to the posture switching instruction, the virtual object is controlled to switch from a standing state to a non-standing state, and then the virtual object is controlled to automatically run in the virtual scene in the non-standing state. In certain embodiments, referring to FIG. 4, a posture switching icon 43 is displayed in the UI. When the user clicks/taps the posture switching icon 43, the mobile terminal receives a posture switching instruction. In certain embodiments, the posture switching icon 43 may be a squatting icon.

In certain embodiments, to get closer to a running manner of an object in an actual environment, a speed when automatically running in a non-standing state is lower than a speed when automatically running in a standing state. For example, when the virtual object automatically runs in a virtual scene in a squatting state, a speed when automatically running is 1 m/s in this situation. If the mobile terminal receives a posture switching instruction, the virtual object is controlled to switch from the squatting state to a standing state, and the virtual object is controlled to automatically run in the virtual scene in a standing state. In this situation, a speed when automatically running is 3 m/s.

In certain embodiments, to improve the man-machine interaction experience and to help the user learn a state of the virtual object conveniently, when in response to determining the virtual object is in a non-standing state, first prompt information is displayed in a UI, the first prompt information being used for indicating that the virtual object is in the non-standing state; and when in response to determining the virtual object is in a standing state, second prompt information is displayed in the UI, the second prompt information being used for indicating that the virtual object is in the standing state. In certain embodiments, the first prompt information and the second prompt information may be displayed based on the same icon. For example, as shown in FIG. 4, both the first prompt information and the second prompt information are displayed based on the posture switching icon 43 in the UI. The posture switching icon 43 is used for indicating whether the virtual object is in a standing state or a squatting state. When the virtual object is in a squatting state, the first prompt information is displayed, for example, the posture switching icon 43 is highlighted. When the virtual object is in a standing state, the second prompt information is displayed, for example, the posture switching icon 43 is not highlighted.

In addition, in this embodiment of the present disclosure, a standing state is a state in which a virtual object stands, and a non-standing state is a state in which a virtual object does not stand. In a possible implementation, the non-standing state may be a squatting state, that is, a state in which the virtual object squats. In this embodiment of the present disclosure, a direction and speed of the virtual object when automatically running may be preset. For example, a direction of the virtual object when automatically running may be preset to a front direction, and a speed of the virtual object when automatically running may be preset to 3 m/s, the front direction being a direction that the virtual object is facing.

In summary, according to the technical solution provided in this embodiment of the present disclosure, a joystick control is displayed in a UI; and when in response to determining a quick click/tap operation signal acting on a target region corresponding to the joystick control is received, a virtual object is controlled to automatically run in a virtual environment displayed in the UI, triggering a virtual object to automatically run with one key without requiring the user to continuously click/tap or long press an operation control, thereby improving the operation efficiency. Moreover, after the user triggers the virtual object to start to automatically run, a finger of the user may be released, and then some other operations are performed with the released finger, for example, observing a virtual environment during running, changing equipment during running, and communicating with other users during running, thereby bringing more diversified interaction functions.

In addition, before receiving the quick click/tap operation signal acting on the target region, if the virtual object is in a non-standing state, after the virtual object is triggered to start to automatically run in a non-standing state, the virtual object may be further controlled, through a posture switching instruction, to switch from the non-standing state to a standing state, and then the virtual object is controlled to automatically run in the standing state, thereby providing diversified manners of controlling the virtual object to automatically run to the user, and further improving the man-machine interaction experience.

In a possible implementation, to improve the man-machine interaction experience and the flexibility of controlling the virtual object to automatically run, the foregoing step 303 includes: obtaining an attribute value corresponding to the quick click/tap operation signal; determining a running speed of the virtual object according to the attribute value; and controlling the virtual object to automatically run in the virtual scene according to the running speed.

In this embodiment of the present disclosure, the attribute value is an operation parameter corresponding to the quick click/tap operation signal. For example, the attribute value may be an operation time interval or a quantity of operations. This is not limited in this embodiment of the present disclosure.

For example, when the quick click/tap operation signal is a double-click/tap operation signal, the attribute value is a click/tap time interval of the double-click/tap operation signal. In certain embodiments, the click/tap time interval of the double-click/tap operation signal has a negative correlation with the running speed of the virtual object. That is, a shorter click/tap time interval indicates a higher running speed, and a longer click/tap time interval indicates a lower running speed.

In certain embodiments, the attribute value of the quick click/tap operation signal may alternatively be a quantity of clicks/taps. In certain embodiments, the quantity of clicks/taps of the quick click/tap operation signal has a positive correlation with the running speed of the virtual object. That is, a larger quantity of clicks/taps indicates a higher running speed, and a smaller quantity of clicks/taps indicates a lower running speed.

In another possible implementation, to further improve the man-machine interaction experience and the flexibility of controlling the virtual object to automatically run, the foregoing step 303 includes that the mobile terminal may detect an operation position of the quick click/tap operation signal; determine a running direction of the virtual object according to the operation position; and control the virtual object to automatically run in the virtual scene according to the running direction. For example, the target region is evenly divided into four regions, which are recorded as a region 1, a region 2, a region 3, and a region 4. A direction corresponding to the region 1 is east, a direction corresponding to the region 2 is south, a direction corresponding to the region 3 is west, and a direction corresponding to the region 4 is north. When in response to determining the operation position of the quick click/tap operation signal is detected to be in the region 2, that is, the running direction of the virtual object is determined as south, the virtual object is controlled to automatically run in the virtual scene according to a south direction. In this embodiment of the present disclosure, neither a quantity of regions into which the target region is divided, nor a direction corresponding to each region is limited.

In actual implementation, the foregoing two manners may be combined, to control a running speed and a running direction of the virtual object simultaneously.

Figure 5:
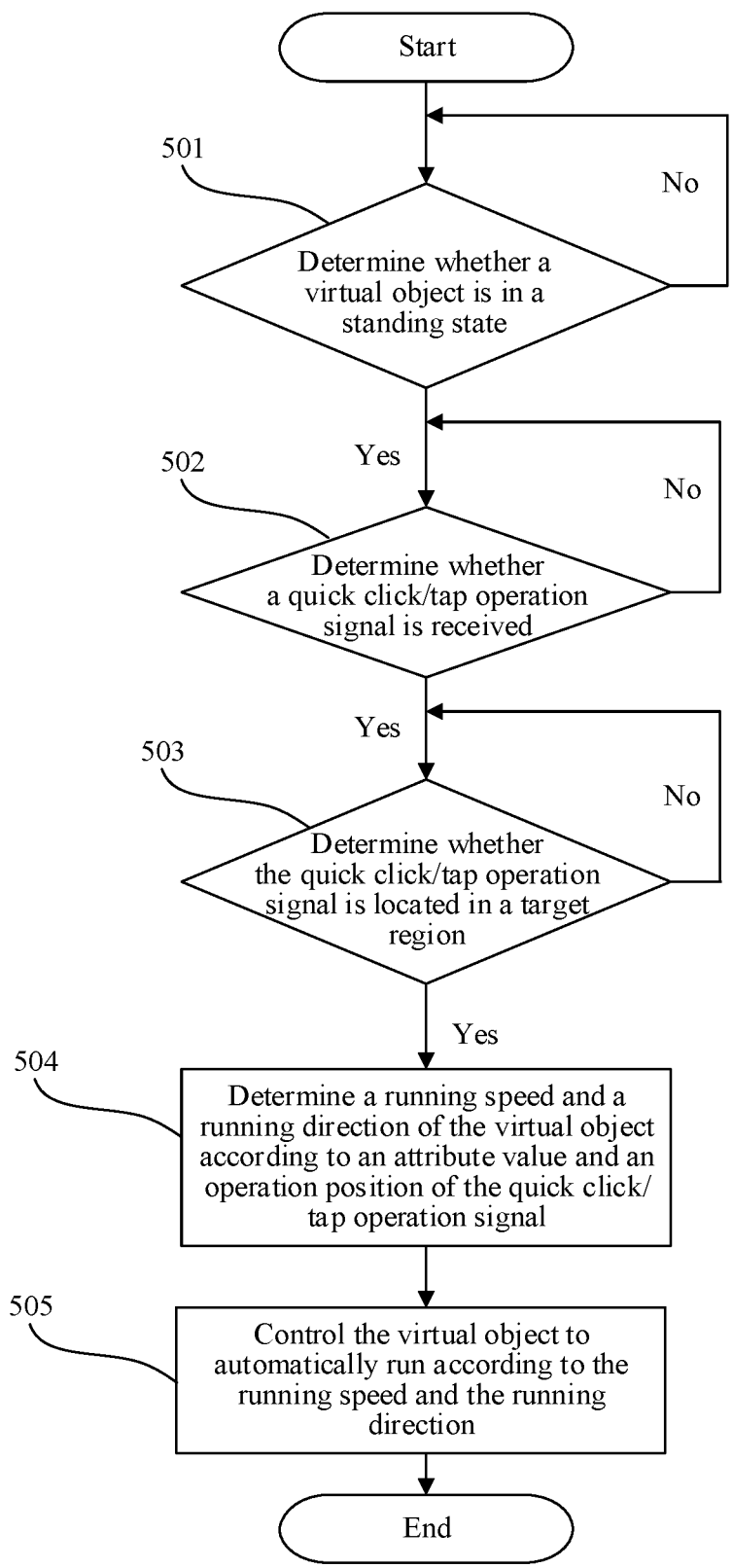
FIG. 5 is a schematic flowchart of a virtual object control method according to one or more embodiments of the present disclosure.

In still another possible implementation, referring to FIG. 5, a virtual object control method provided in an embodiment of the present disclosure may include the following steps:

Step 501: Determine whether a virtual object is in a standing state. Step 502 is performed if the virtual object is in a standing state; and step 501 continues to be performed if the virtual object is not in a standing state.

Step 502: Determine whether a quick click/tap operation signal is received. Step 503 is performed if a quick click/tap operation signal is received; and step 502 continues to be performed if a quick click/tap operation signal is not received.

Step 503: Determine whether the quick click/tap operation signal is located in a target region. Step 504 is performed if the quick click/tap operation signal is located in a target region; and step 503 continues to be performed if the quick click/tap operation signal is not located in a target region.

Step 504: Determine a running speed and a running direction of the virtual object according to an attribute value and an operation position of the quick click/tap operation signal.

Step 505: Control the virtual object to automatically run according to the running speed and the running direction.

In summary, according to the technical solution provided in this embodiment of the present disclosure, a running speed and a running direction when a virtual object automatically runs are determined according to an attribute value and an operation position of a quick click/tap operation signal, so as to provide more virtual object control manners to a user, and to better satisfy operation requirements of the user.

Figure 6:
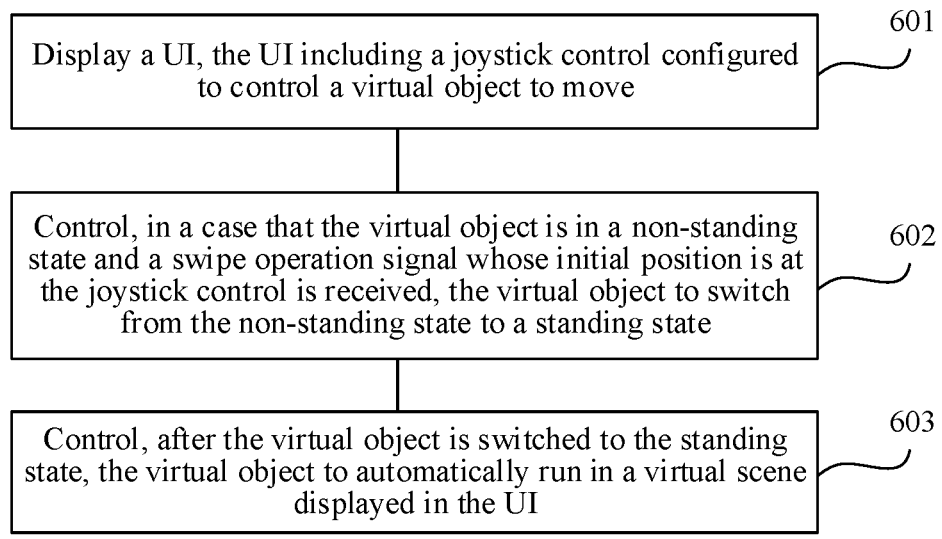
FIG. 6 is a schematic flowchart of a virtual object control method according to one or more embodiments of the present disclosure.

FIG. 6 is a flowchart of a virtual object control method according to another embodiment of the present disclosure. The method is applicable to the mobile terminal described above, such as a client of an application (for example, an STG application) in the mobile terminal. The method may include the following steps:

Step 601: Display a UI, the UI including a joystick control configured to control a virtual object to move.

Step 602. Control, when in response to determining the virtual object is in a non-standing state and a swipe operation signal whose initial position is at the joystick control is received, the virtual object to switch from the non-standing state to a standing state.

In an exemplary embodiment, before the controlling the virtual object to switch from the non-standing state to a standing state, the method further includes: obtaining a touch position of the swipe operation signal; and performing, when in response to determining the touch position of the swipe operation signal is in a display position of a quick stand-up icon, the operation of controlling the virtual object to switch from the non-standing state to a standing state. In certain embodiments, when the touch position of the swipe operation signal is in the display position of the quick stand-up icon, the quick stand-up icon may be highlighted to serve as a prompt that switching to a triggered state succeeds, thereby improving the man-machine interaction efficiency.

In an exemplary embodiment, after the obtaining a touch position of the swipe operation signal, the method further includes: obtaining a distance between the touch position of the swipe operation signal and a target position; and displaying the quick stand-up icon in the UI when in response to determining the distance is detected to be greater than a distance threshold. The target position is a center position of the joystick control. In this embodiment of the present disclosure, a size of the distance threshold is set according to a size of a UI of a used mobile terminal. For example, when the mobile terminal is a tablet computer, the distance threshold is set to 5 cm, and when the mobile terminal is a mobile phone, the distance threshold is set to 3 cm. Through the foregoing settings, the distance threshold may vary flexibly according to different sizes of UIs of used mobile terminals, further improving the man-machine interaction experience.

In an exemplary embodiment, to provide more virtual object control manners and to further improve the man-machine interaction experience, after the obtaining a distance between the touch position of the swipe operation signal and a target position, the method further includes: determining a moving speed of the virtual object according to the distance, the distance having a negative correlation with the moving speed. That is, a longer distance indicates a lower moving speed, and a shorter distance indicates a higher moving speed. That is, as the touch position of the swipe operation signal gets increasingly close to the target position, the moving speed of the virtual object is increasingly high.

Step 603: Control, after the virtual object is switched to the standing state, the virtual object to automatically run in a virtual scene displayed in the UI.

Figure 7:
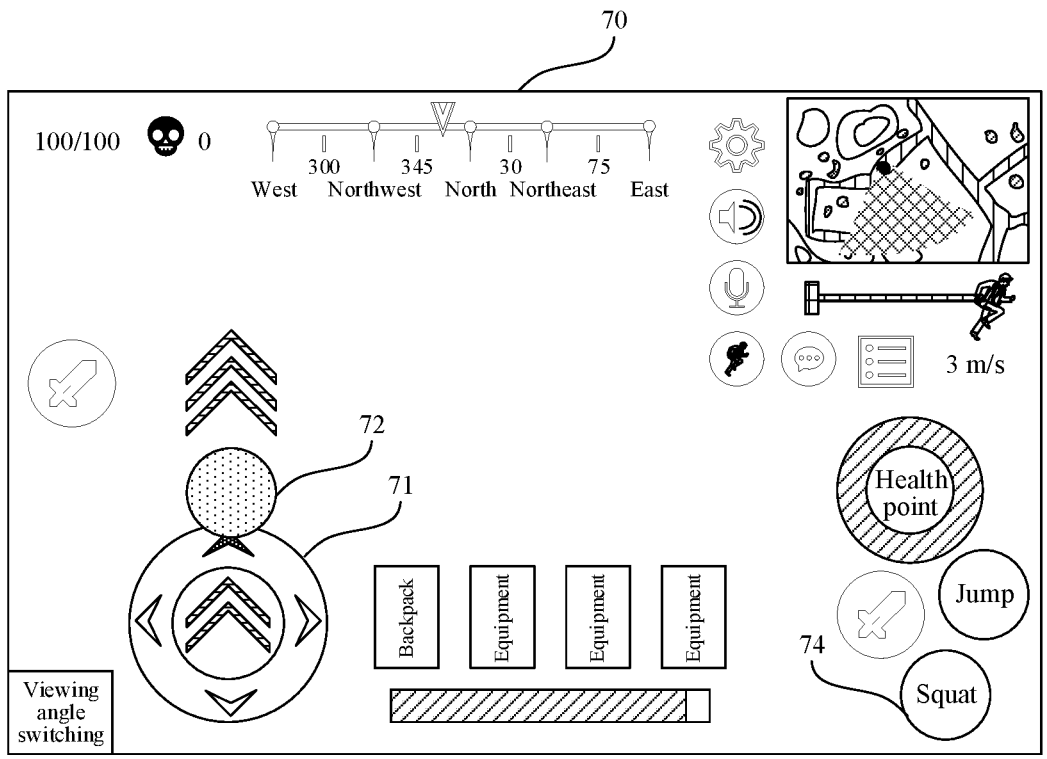
FIG. 7 is a schematic diagram of another UI one or more embodiments of the present disclosure.
Figure 7:
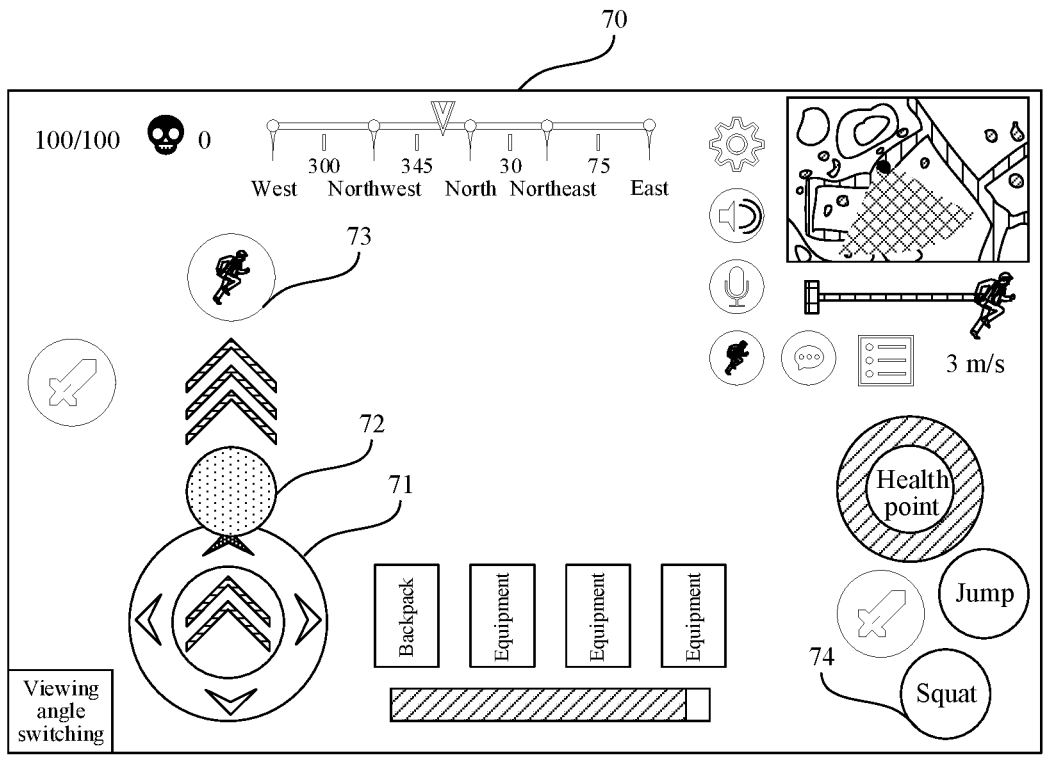

In an exemplary embodiment, as shown in FIG. 7(a), a UI 70 includes a joystick control 71 and a quick stand-up icon 73. The joystick control 71 is configured to control a virtual object to move, and the quick stand-up icon 73 is configured to switch a state of the virtual object and control the virtual object to automatically run in a virtual scene after the state switching. In certain embodiments, the joystick control 71 includes a drag icon 72, and the drag icon 72 is used for changing a moving speed and direction of a virtual object. In certain embodiments, to improve the man-machine interaction experience, the drag icon 72 may change its position in real time according to the swipe operation signal, and position changing of the drag icon 72 reflects position changing of the virtual object. In certain embodiments, a center position of the drag icon coincides with a center position of the touch position of the swipe operation signal. For example, when the swipe operation signal is to quickly swipe to an upper left corner of the UI, the drag icon 72 also quickly moves to the upper left corner of the UI, and a situation that the virtual object quickly moves toward northwest is reflected in the virtual scene displayed in the UI. In addition, when a distance between the center position of the drag icon and the center position of the joystick control is greater than a distance threshold, the quick stand-up icon 73 is displayed in the UI 70. As shown in FIG. 7(b), when the center position of the drag icon 72 is in the display position of the quick stand-up icon 73, the virtual object is controlled to quickly stand up and then automatically run, and the quick stand-up icon 73 is controlled to be highlighted. In certain embodiments, as shown in FIG. 7(a), the UI 70 includes a squatting icon 74, and when the virtual object is in a squatting state, the squatting icon 74 is highlighted. In certain embodiments, as shown in FIG. 7(*b*), when the center position of the drag icon 72 is in the display position of the quick stand-up icon 73, the virtual object is controlled to quickly stand up and then automatically run, and the squatting icon 74 is not highlighted.

In summary, according to the technical solution provided in this embodiment of the present disclosure, when a virtual object is in a non-standing state, the virtual object is controlled to quickly stand up first and then automatically run, which avoids a situation where after the virtual object in a non-standing state is controlled to automatically run, some operations are further required to control the virtual object to stand up and automatically run, so as to further improve the man-machine interaction efficiency and the man-machine interaction experience.

Figure 8:
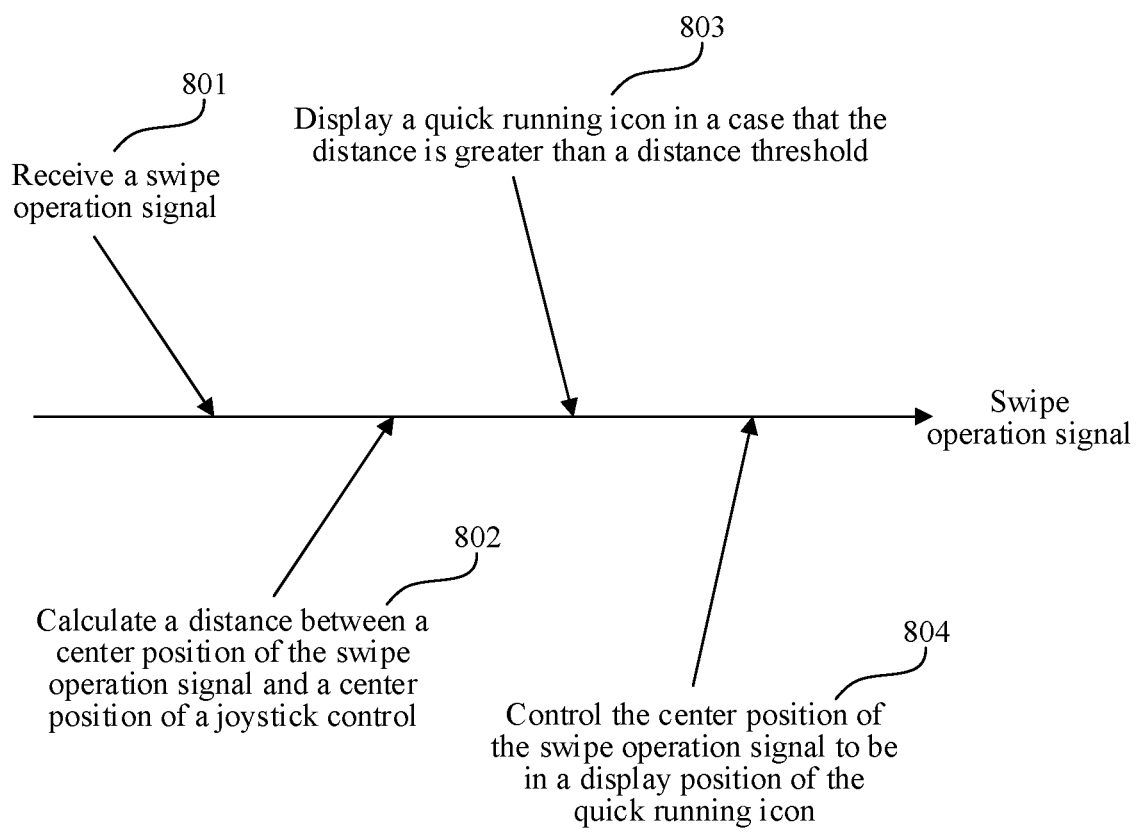
FIG. 8 is a schematic flowchart of a swipe operation signal control method according to one or more embodiments of the present disclosure.

In a possible implementation, referring to FIG. 8, a swipe operation signal control method provided in an embodiment of the present disclosure may include the following steps:

Step 801: Receive a swipe operation signal.

Step 802: Calculate a distance between a center position of the swipe operation signal and a center position of a joystick control.

Step 803: Display a quick running icon when in response to determining the distance is greater than a distance threshold.

Step 804: Control the center position of the swipe operation signal to be in a display position of the quick running icon.

Figure 9:
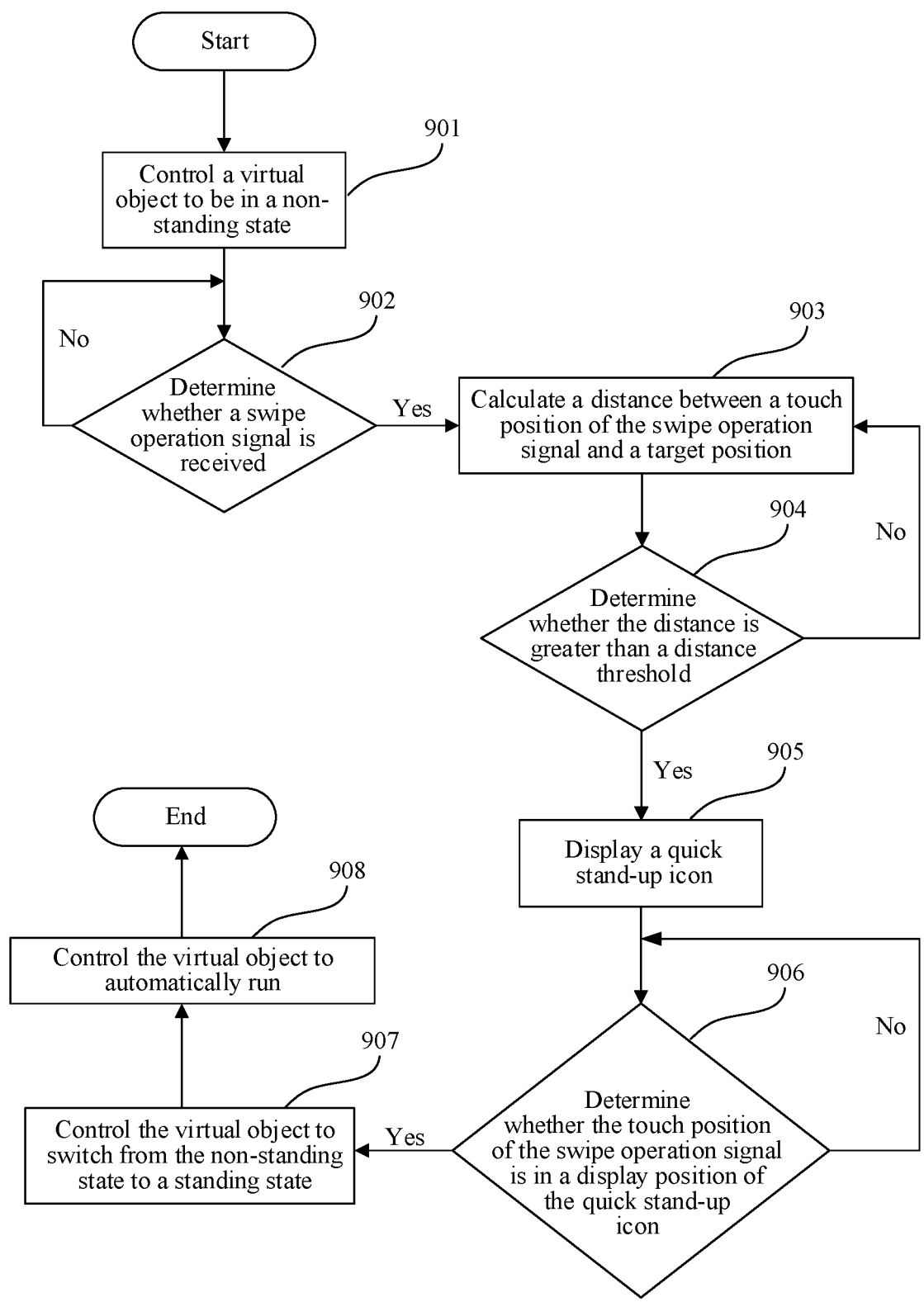
FIG. 9 is a schematic flowchart of a virtual object control method according to one or more embodiments of the present disclosure.

In a possible implementation, referring to FIG. 9, a virtual object control method provided in an embodiment of the present disclosure may include the following steps:

Step 901: Control a virtual object to be in a non-standing state.

Step 902: Determine whether a swipe operation signal is received. Step 903 is performed if a swipe operation signal is received; and step 902 continues to be performed if a swipe operation signal is not received.

Step 903: Obtain a distance between a touch position of the swipe operation signal and a target position.

Step 904: Determine whether the distance is greater than a distance threshold. Step 905 is performed if the distance is greater than a distance threshold; and step 903 is performed if the distance is not greater than a distance threshold.

Step 905: Display a quick stand-up icon.

Step 906: Determine whether the touch position of the swipe operation signal is in a display position of the quick stand-up icon. Step 907 is performed if the touch position of the swipe operation signal is in a display position of the quick stand-up icon; and step 906 continues to be performed if the touch position of the swipe operation signal is not in a display position of the quick stand-up icon.

Step 907: Control the virtual object to switch from the non-standing state to a standing state.

Step 908: Control the virtual object to automatically run.

In a possible implementation, the foregoing method may further include the following steps:

displaying a UI, the UI including an automatic running icon used for controlling a virtual object to automatically run; receiving a triggering signal acting on the automatic running icon; and controlling, according to the triggering signal, the virtual object to automatically run.

Figure 10:
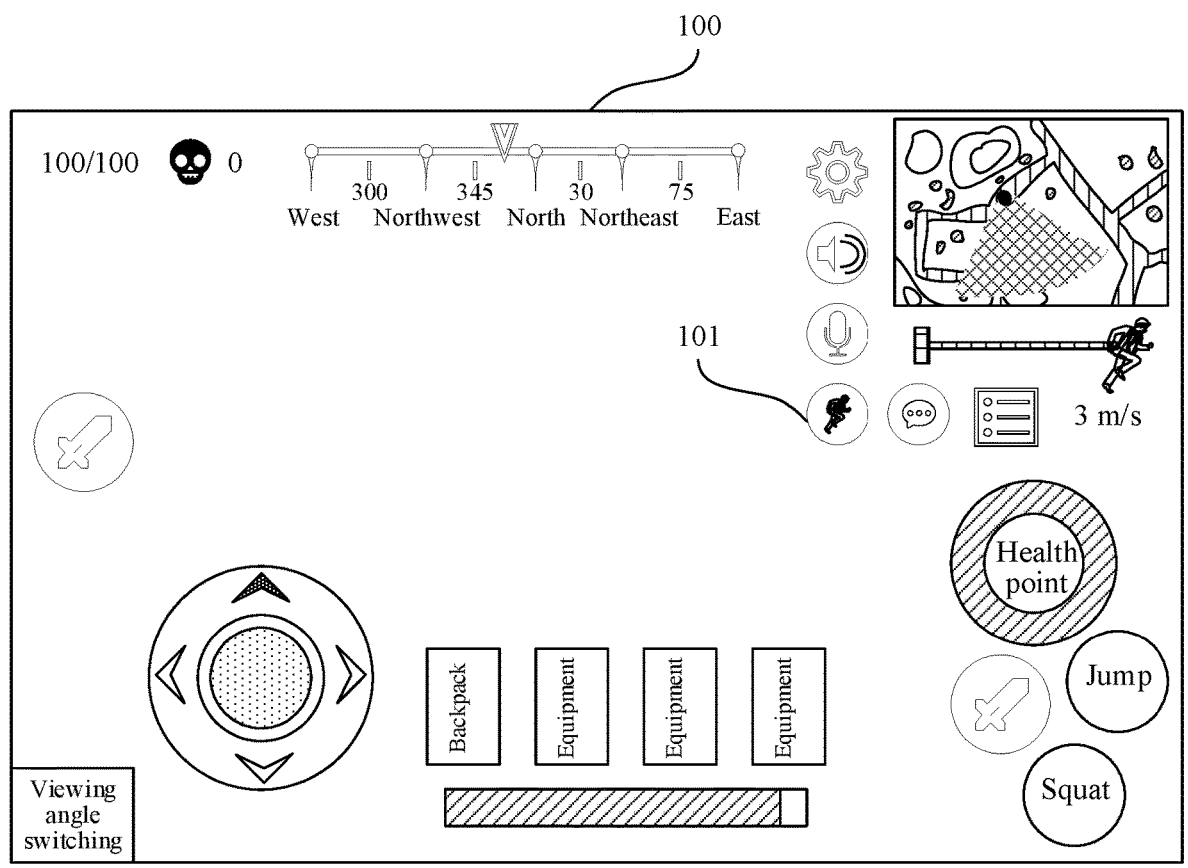
FIG. 10 is a schematic diagram of yet another UI according to one or more embodiments of the present disclosure.

For example, as shown in FIG. 10, an automatic running icon 101 is displayed in a UI 100, and when a triggering signal corresponding to the automatic running icon 101 is received, a virtual object is controlled to automatically run. In certain embodiments, after the virtual object automatically runs, the automatic running icon 101 is highlighted to serve as a prompt that the virtual object is in an automatic running state. In certain embodiments, the triggering signal may be a click/tap signal, or may be a press signal. This is not limited in this embodiment of the present disclosure.

In another possible implementation, the foregoing method may further include the following steps:

obtaining a touch position of the swipe operation signal when in response to determining a swipe operation signal whose initial position is at the joystick control is received; displaying an automatic running icon when in response to determining a distance between a center position of the touch position of the swipe operation signal and a center position of the joystick control is greater than a distance threshold; and controlling, when in response to determining the touch position of the swipe operation signal is in a display position of the automatic running icon, the virtual object to automatically run.

In certain embodiments, the joystick control includes a drag icon used for controlling a virtual object to move, and a center position of the drag icon coincides with the center position of the touch position of the swipe operation signal.

In certain embodiments, after the virtual object automatically runs, the automatic running icon is highlighted to serve as a prompt that the virtual object is in an automatic running state.

Figure 11:
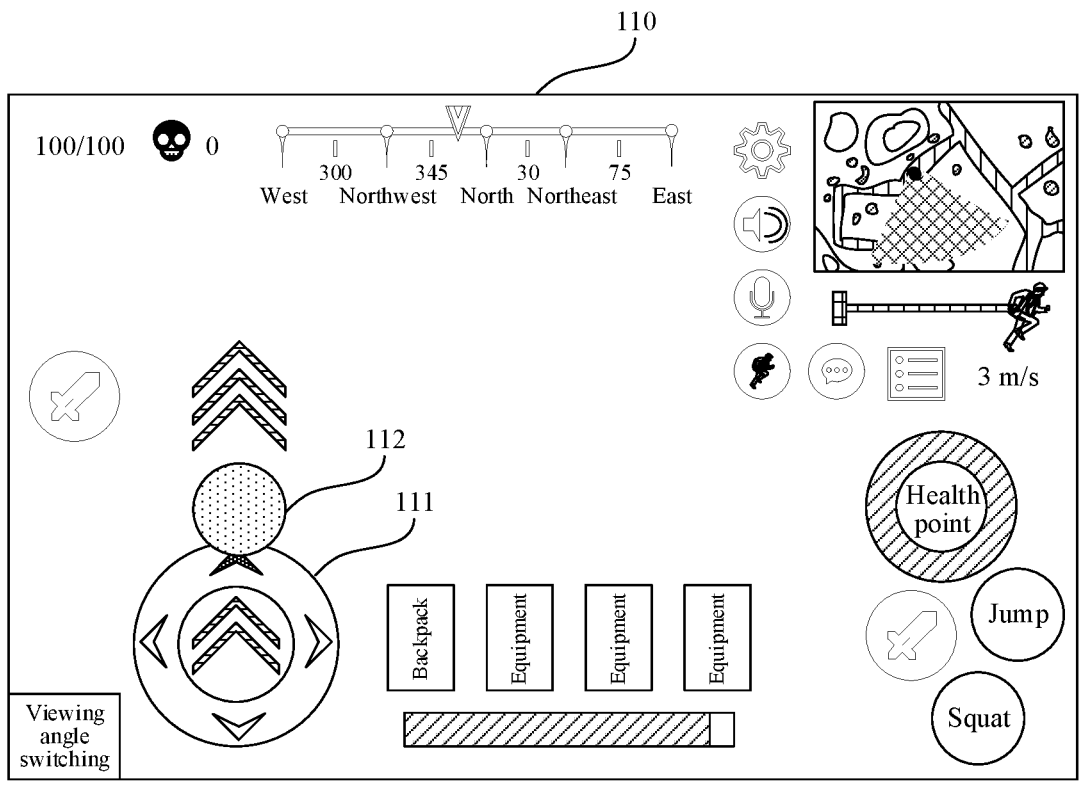
FIG. 11 is a schematic diagram of still yet another UI according to one or more embodiments of the present disclosure.
Figure 11:
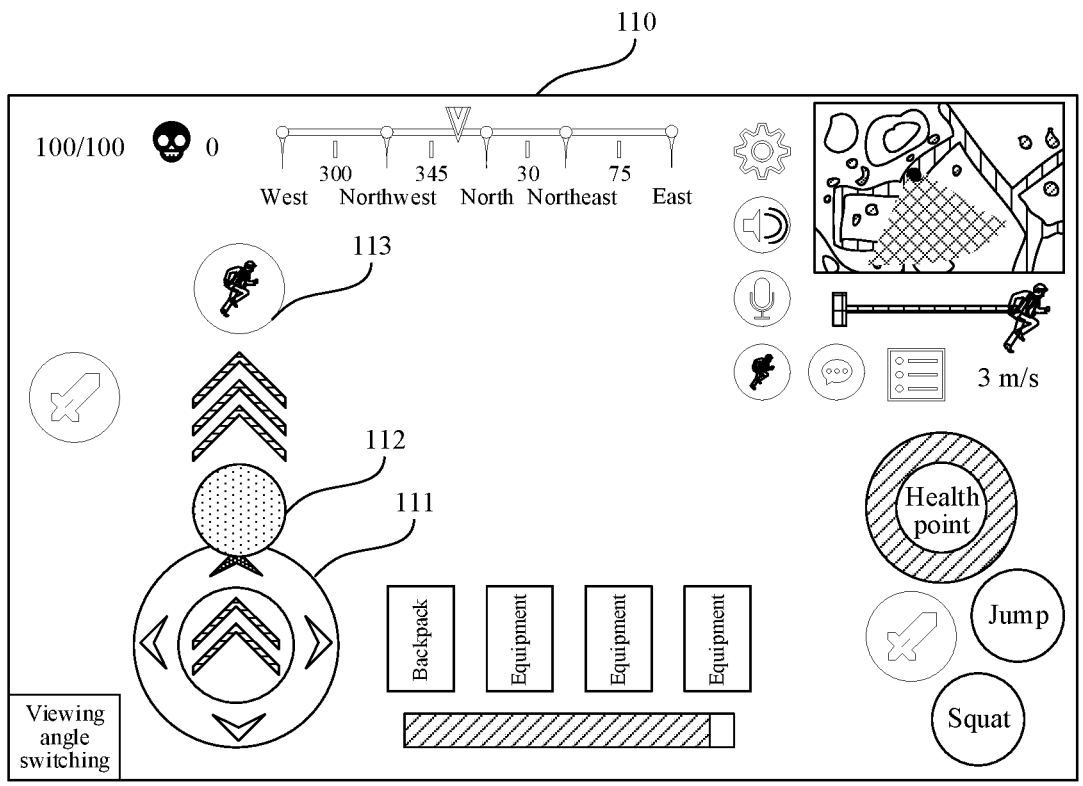

For example, as shown in FIG. 11(*a*), a joystick control 111 is displayed in a UI 110, the joystick control 111 includes a drag icon 112, and a position of the drag icon 112 may be changed by receiving a swipe operation signal. As shown in FIG. 11(*b*), when the center position of the touch position of the swipe operation signal coincides with a center position of the joystick control 111, that is, the center position of the touch position of the swipe operation signal coincides with a center position of the drag icon 112, an automatic running icon 113 is displayed in the UI. When the center position of the drag icon 112 is in a display position of the automatic running icon 113, a virtual object is controlled to automatically run, and the automatic running icon 113 is controlled to be highlighted.

Figure 12:
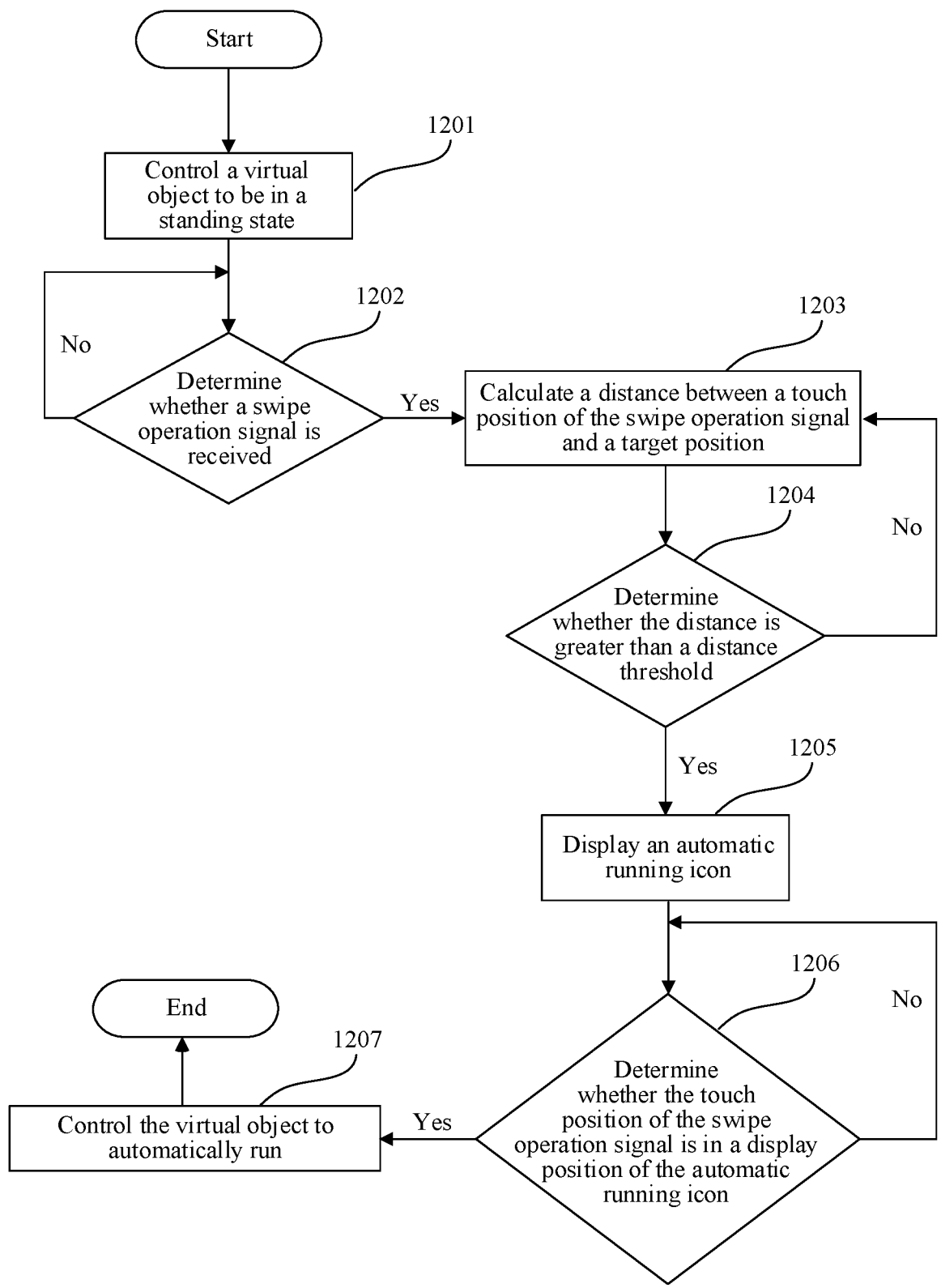
FIG. 12 is a schematic flowchart of a virtual object control method according to one or more embodiments of the present disclosure.

In a possible implementation, referring to FIG. 12, a virtual object control method provided in an embodiment of the present disclosure may include the following steps:

Step 1201: Control a virtual object to be in a standing state.

Step 1202: Determine whether a swipe operation signal is received. Step 1203 is performed if a swipe operation signal is received; and step 1202 continues to be performed if a swipe operation signal is not received.

Step 1103: Obtain a distance between a touch position of the swipe operation signal and a target position.

Step 1104: Determine whether the distance is greater than a distance threshold. Step 1205 is performed if the distance is greater than a distance threshold; and step 1203 is performed if the distance is not greater than a distance threshold.

Step 1205: Display an automatic running icon.

Step 1206: Determine whether the touch position of the swipe operation signal is in a display position of the automatic running icon. Step 1207 is performed if the touch position of the swipe operation signal is in a display position of the automatic running icon; and step 1206 continues to be performed if the touch position of the swipe operation signal is not in a display position of the automatic running icon.

Step 1207: Control the virtual object to automatically run.

The following are apparatus embodiments of the present disclosure, which can be used to perform the method embodiments of the present disclosure. For details not disclosed in the apparatus embodiments of the present disclosure, reference may be made to the method embodiments of the present disclosure.

Figure 13:
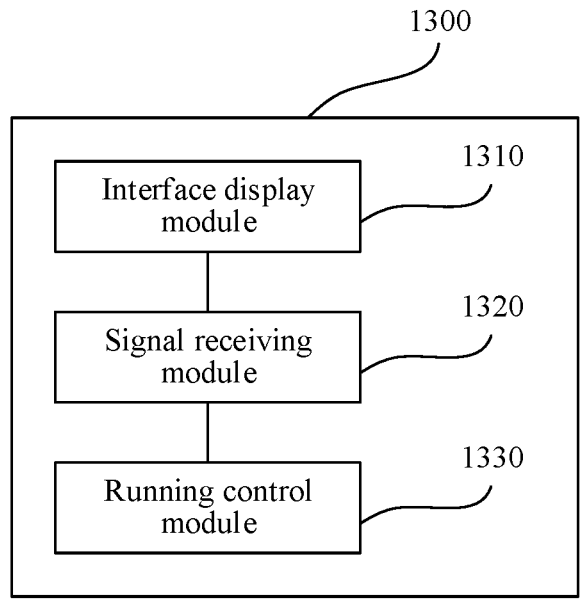
FIG. 13 is a schematic block diagram of a virtual object control apparatus according to one or more embodiments of the present disclosure.

FIG. 13 is a block diagram of a virtual object control apparatus according to an embodiment of the present disclosure. The apparatus has functions of implementing the foregoing method embodiments. The functions may be implemented by hardware, or may be implemented by hardware executing corresponding software. The apparatus may be a mobile terminal or set in a mobile terminal. The apparatus 1300 may include: an interface display module 1310, a signal receiving module 1320, and a running control module 1330.

The interface display module 1310 is configured to display a UI, the UI including a joystick control configured to control a virtual object to move.

The signal receiving module 1320 is configured to receive a quick click/tap operation signal acting on a target region corresponding to the joystick control.

The running control module 1330 is configured to control, according to the quick click/tap operation signal, the virtual object to automatically run in a virtual scene displayed in the UI.

Figure 14:
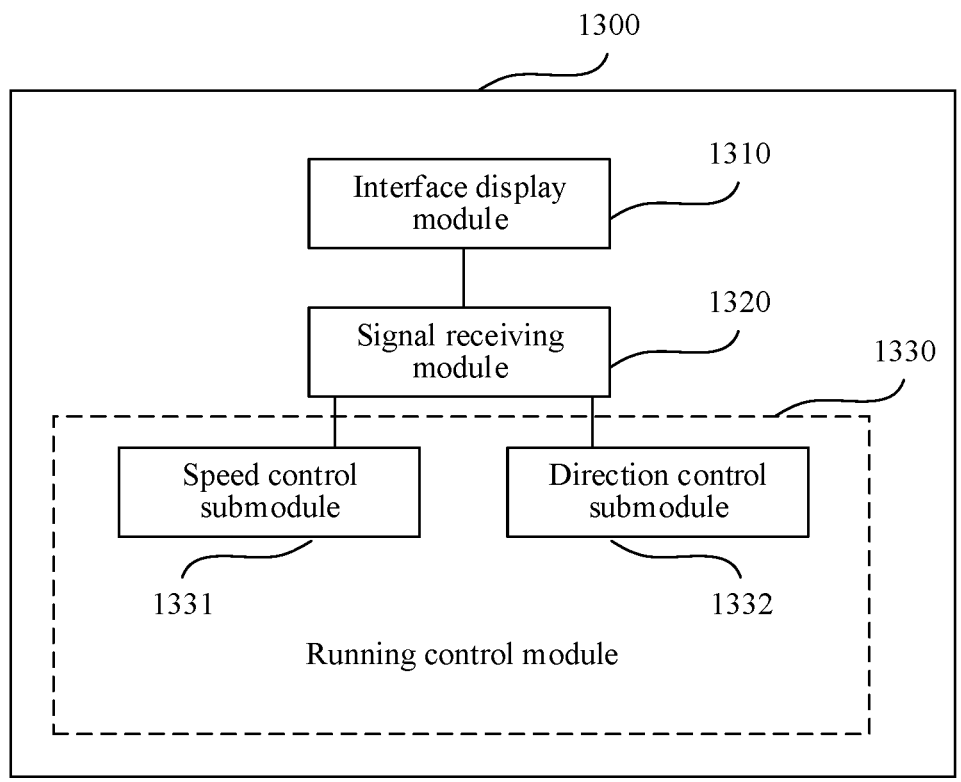
FIG. 14 is a schematic block diagram of a virtual object control apparatus according to one or more embodiments of the present disclosure.

In an exemplary embodiment, as shown in FIG. 14, the signal receiving module 1320 is configured to: receive a quick click/tap operation signal acting on a target region corresponding to the joystick control; or receive a press operation signal acting on a target region corresponding to the joystick control.

In an exemplary embodiment, as shown in FIG. 14, the running control module 1330 includes a speed control submodule 1331, configured to: obtain an attribute value corresponding to the quick click/tap operation signal; determine a running speed of the virtual object according to the attribute value; and control the virtual object to automatically run in the virtual scene according to the running speed.

In an exemplary embodiment, as shown in FIG. 14, the running control module 1330 includes a direction control submodule 1332, configured to: detect an operation position corresponding to the quick click/tap operation signal; determine a running direction of the virtual object according to the operation position; and control the virtual object to automatically run in the virtual scene according to the running direction.

In an exemplary embodiment, the running control module 1330 is further configured to: control, when in response to determining the quick click/tap operation signal is received and the virtual object is in a non-standing state, the virtual object to automatically run in the virtual scene in the non-standing state.

In an exemplary embodiment, the running control module 1330 is further configured to: receive a posture switching instruction corresponding to the virtual object; control, according to the posture switching instruction, the virtual object to switch from the non-standing state to a standing state; and control the virtual object to automatically run in the virtual scene in the standing state.

In summary, according to the technical solution provided in this embodiment of the present disclosure, a joystick control is displayed in a UI; and when in response to determining a quick click/tap operation signal acting on a target region corresponding to the joystick control is received, a virtual object is controlled to automatically run in a virtual environment displayed in the UI, triggering a virtual object to automatically run with one key without requiring the user to continuously click/tap or long press an operation control, thereby improving the operation efficiency. Moreover, after the user triggers the virtual object to start to automatically run, a finger of the user may be released, and then some other operations are performed with the released finger, for example, observing a virtual environment during running, changing equipment during running, and communicating with other users during running, thereby bringing more diversified interaction functions.

In addition, before receiving the quick click/tap operation signal acting on the target region, if the virtual object is in a non-standing state, after the virtual object is triggered to start to automatically run in a non-standing state, the virtual object may be further controlled, through a posture switching instruction, to switch from the non-standing state to a standing state, and then the virtual object is controlled to automatically run in the standing state, thereby providing diversified manners of controlling the virtual object to automatically run to the user, and further improving the man-machine interaction experience.

Figure 15:
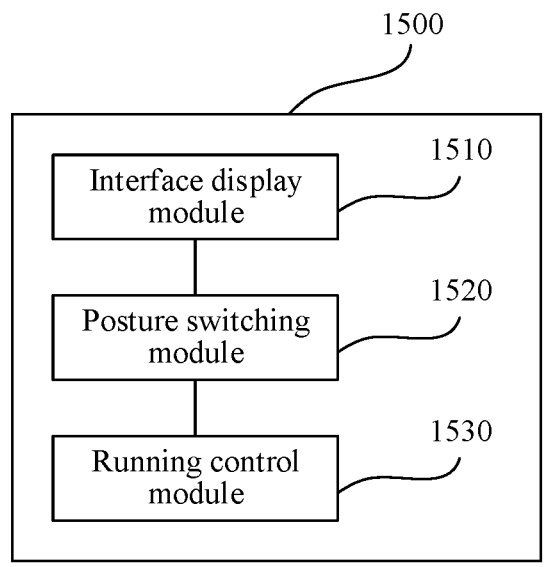
FIG. 15 is a schematic block diagram of a virtual object control apparatus according to one or more embodiments of the present disclosure.

FIG. 15 is a block diagram of a virtual object control apparatus according to another embodiment of the present disclosure. The apparatus has functions of implementing the foregoing method embodiments. The functions may be implemented by hardware, or may be implemented by hardware executing corresponding software. The apparatus may be a mobile terminal or set in a mobile terminal. The apparatus 1500 may include: an interface display module 1510, a posture switching module 1520, and a running control module 1530.

The interface display module 1510 is configured to display a UI, the UI including a joystick control configured to control a virtual object to move.

The posture switching module 1520 is configured to control, when or in response to determining the virtual object is in a non-standing state and a swipe operation signal whose initial position is at the joystick control is received, the virtual object to switch from the non-standing state to a standing state.

The running control module 1530 is configured to control, after the virtual object is switched to the standing state, the virtual object to automatically run in a virtual scene displayed in the UI.

In an exemplary embodiment, the posture switching module 1520 is further configured to: obtain a touch position of the swipe operation signal; perform, when or in response to determining the touch position of the swipe operation signal is in a display position of a quick stand-up icon, the operation of controlling the virtual object to switch from the non-standing state to a standing state.

In an exemplary embodiment, the posture switching module 1520 is further configured to: obtain a distance between the touch position of the swipe operation signal and a target position; and display the quick stand-up icon in the UI when or in response to determining the distance is detected to be greater than a distance threshold.

In an exemplary embodiment, the posture switching module 1520 is further configured to: determine a moving speed of the virtual object according to the distance, the distance having a negative correlation with the moving speed.

Figure 16:
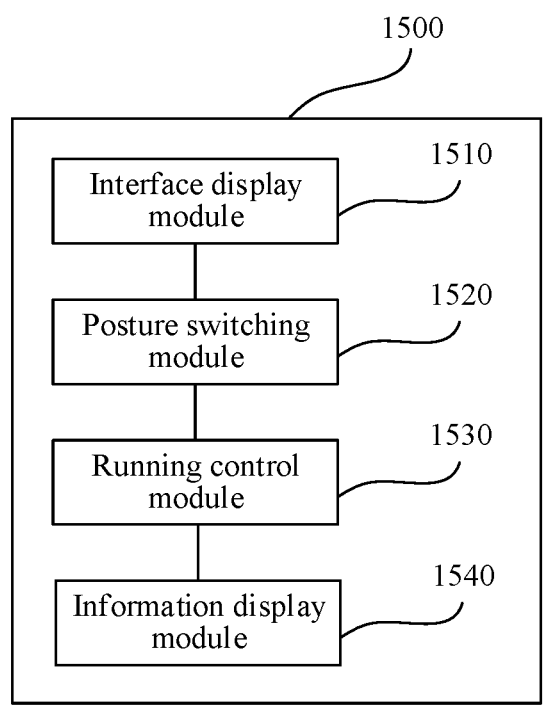
FIG. 16 is a schematic block diagram of a virtual object control apparatus according to one or more embodiments of the present disclosure.

In an exemplary embodiment, as shown in FIG. 16, the apparatus 1500 further includes an information display module 1540, configured to: display first prompt information in the UI when or in response to determining the virtual object is in the non-standing state, the first prompt information being used for indicating that the virtual object is in the non-standing state; and display second prompt information in the UI when or in response to determining the virtual object is in the standing state, the second prompt information being used for indicating that the virtual object is in the standing state.

In summary, according to the technical solution provided in this embodiment of the present disclosure, when a virtual object is in a non-standing state, the virtual object is controlled to quickly stand up first and then automatically run, which avoids a situation where after the virtual object in a non-standing state is controlled to automatically run, some operations are further required to control the virtual object to stand up and automatically run, so as to further improve the man-machine interaction efficiency and the man-machine interaction experience.

When the apparatus provided in the foregoing embodiment implements its functions, a description is given only by using the foregoing division of function modules as an example. In actual implementations, the functions may be allocated to and implemented by different function modules according to the requirements, that is, the internal structure of the device may be divided into different function modules, to implement all or some of the functions described above. In addition, the apparatus and method embodiments provided in the foregoing embodiments belong to the same conception. For the specific implementation process, refer to the method embodiments, so the details are not described herein again.

Figure 17:
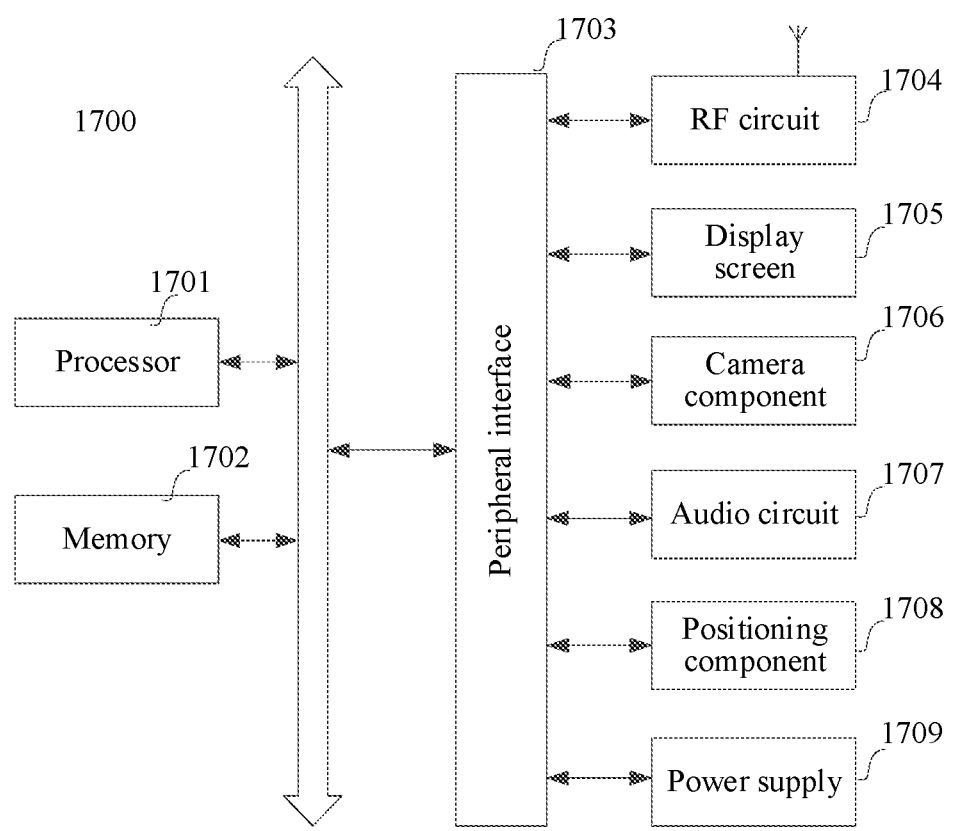
FIG. 17 is a schematic structural block diagram of a mobile terminal according to one or more embodiments of the present disclosure.

FIG. 17 is a structural block diagram of a mobile terminal 1700 according to an embodiment of the present disclosure. The mobile terminal 1700 may be a portable electronic device, such as a mobile phone, a tablet computer, a game console, an ebook reader, a multimedia playback device, and a wearable device. The mobile terminal is configured to implement the virtual object control method provided in the foregoing embodiments. The mobile terminal may be the mobile terminal 10 in the implementation environment shown in FIG. 1.

Generally, the mobile terminal 1700 includes a processor 1701 and a memory 1702.

The processor 1701 may include one or more processing cores. For example, the processor may be a 4-core processor or an 8-core processor. The processor 1701 may be implemented by using at least one hardware form of a digital signal processor (DSP), a field programmable gate array (FPGA), and a programmable logic array (PLA). The processor 1701 may alternatively include a main processor and a coprocessor. The main processor is configured to process data in an active state, also referred to as a central processing unit (CPU). The coprocessor is a low-power processor configured to process data in a standby state. In some embodiments, a graphics processing unit (GPU) may be integrated into the processor 1701. The GPU is configured to be responsible for rendering and drawing content to be displayed on a display screen. In some embodiments, the processor 1701 may further include an AI processor. The AI processor is configured to process computing operations related to machine learning.

The memory 1702 may include one or more computer-readable storage media. The computer-readable storage media may be non-transient. The memory 1702 may further include a high-speed random access memory (RAM), and a non-volatile memory such as one or more magnetic disk storage devices or flash storage devices. In some embodiments, the non-transient computer-readable storage medium in the memory 1702 is configured to store at least one instruction, at least one program, a code set, or an instruction set, the at least one instruction, the at least one program, the code set, or the instruction set being configured to be executed by one or more processors to implement the virtual object control method In some embodiments, the mobile terminal 1700 may In certain embodiments include: a peripheral interface 1703 and at least one peripheral. The processor 1701, the memory 1702, and the peripheral interface 1703 may be connected by a bus or a signal cable. Each peripheral may be connected to the peripheral interface 1703 through a bus, a signal cable, or a circuit board. In certain embodiments, the peripheral includes: at least one of a radio frequency (RF) circuit 1704, a display screen 1705, a camera component 1706, an audio circuit 1707, a positioning component 1408, and a power supply 1709.

A person skilled in the art may understand that the structure shown in FIG. 17 does not constitute a limitation to the mobile terminal 1700, and the mobile terminal may include more or fewer components than those shown in the figure, or some components may be combined, or a different component arrangement may be used.

An exemplary embodiment of the present disclosure further provides a storage medium, the storage medium being configured to store a computer program, the computer program being configured to perform the virtual object control method.

In certain embodiments, the computer-readable storage medium may include: a read-only memory (ROM), a RAM, a solid state drive (SSD), an optical disc, or the like. The RAM may include a resistive RAM (ReRAM) and a dynamic RAM (DRAM).

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In an exemplary embodiment, a computer program product is further provided, the computer program product, when run on a terminal device, causing the terminal device to perform the foregoing virtual object control method.

In certain embodiments, the term "a plurality of" means two or more. "And/or" describes an association relationship for associated objects and represents that three relationships may exist. For example, A and/or B may represent the following three situations: only A exists, both A and B exist, and only B exists. The character "/" generally indicates an "or" relationship between the associated objects. In addition, the step numbers described in the present disclosure merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A virtual object control method, performed by a terminal device, the method comprising:
    displaying a user interface (UI), the UI including a joystick control configured to control a virtual object to move;
    receiving a quick click/tap operation signal acting on a target region corresponding to the joystick control; and
    controlling, according to the quick click/tap operation signal, the virtual object to run in a virtual scene displayed in the UI, comprising:
        obtaining an attribute value corresponding to the quick click/tap operation signal;
        determining a running speed of the virtual object according to the attribute value; and
        controlling the virtual object to run in the virtual scene according to the running speed.

2. The method according to claim 1, wherein controlling the virtual object to run comprises:
    detecting an operation position corresponding to the quick click/tap operation signal;
    determining a running direction of the virtual object according to the operation position; and
    controlling the virtual object to run in the virtual scene according to the running direction.

3. The method according to claim 1, wherein controlling the virtual object to run comprises:
    controlling, in response to determining the quick click/tap operation signal is received and the virtual object is in a non-standing state, the virtual object to run in the virtual scene in the non-standing state.

4. The method according to claim 3, further comprising:
    receiving a posture switching instruction corresponding to the virtual object;
    controlling, according to the posture switching instruction, the virtual object to switch from the non-standing state to a standing state; and
    controlling the virtual object to automatically run in the virtual scene in the standing state.

5. The method according to claim 1, wherein the UI further includes a quick stand-up icon configured to effect a state switching of the virtual object and to control the virtual object to automatically run in the virtual scene in response to the state switching.

6. The method according to claim 5, wherein the UI further includes a drag icon, and the method further comprises:
    displaying the quick stand-up icon in response to determining a distance between a center position of the drag icon and a center position of the joystick control is greater than a distance threshold.

7. A virtual object control apparatus, comprising: a memory storing computer program instructions; and a processor coupled to the memory and configured to execute the computer program instructions and perform:
    displaying a user interface (UI), the UI including a joystick control configured to control a virtual object to move;
    receiving a quick click/tap operation signal acting on a target region corresponding to the joystick control; and
    controlling, according to the quick click/tap operation signal, the virtual object to run in a virtual scene displayed in the UI, comprising:
        obtaining an attribute value corresponding to the quick click/tap operation signal;
        determining a running speed of the virtual object according to the attribute value; and
        controlling the virtual object to run in the virtual scene according to the running speed.

8. The virtual object control apparatus of claim 7, wherein controlling the virtual object to run comprises:
    detecting an operation position corresponding to the quick click/tap operation signal;
    determining a running direction of the virtual object according to the operation position; and
    controlling the virtual object to run in the virtual scene according to the running direction.

9. The virtual object control apparatus of claim 7, wherein controlling the virtual object to run comprises:
    controlling, in response to determining the quick click/tap operation signal is received and the virtual object is in a non-standing state, the virtual object to run in the virtual scene in the non-standing state.

10. The virtual object control apparatus of claim 9, wherein the processor is configured to execute the computer program instructions and further perform:
    receiving a posture switching instruction corresponding to the virtual object;
    controlling, according to the posture switching instruction, the virtual object to switch from the non-standing state to a standing state; and
    controlling the virtual object to automatically run in the virtual scene in the standing state.

11. The virtual object control apparatus according to claim 7, wherein the UI further includes a quick stand-up icon configured to effect a state switching of the virtual object and to control the virtual object to automatically run in the virtual scene in response to the state switching.

12. The virtual object control apparatus according to claim 11, wherein the UI further includes a drag icon, and the processor is configured to execute the computer program instructions and further perform:
    displaying the quick stand-up icon in response to determining a distance between a center position of the drag icon and a center position of the joystick control is greater than a distance threshold.

13. A non-transitory computer-readable storage medium storing computer program instructions executable by at least one processor to perform:
    displaying a user interface (UI), the UI including a joystick control configured to control a virtual object to move;
    receiving a quick click/tap operation signal acting on a target region corresponding to the joystick control; and
    controlling, according to the quick click/tap operation signal, the virtual object to run in a virtual scene displayed in the UI, comprising:
        obtaining an attribute value corresponding to the quick click/tap operation signal;
        determining a running speed of the virtual object according to the attribute value; and
        controlling the virtual object to run in the virtual scene according to the running speed.

14. The non-transitory computer-readable storage medium of claim 13, wherein controlling the virtual object to run comprises:
    detecting an operation position corresponding to the quick click/tap operation signal;
    determining a running direction of the virtual object according to the operation position; and
    controlling the virtual object to run in the virtual scene according to the running direction.

15. The non-transitory computer-readable storage medium of claim 13, wherein controlling the virtual object to run comprises:
- controlling, in response to determining the quick click/tap operation signal is received and the virtual object is in a non-standing state, the virtual object to run in the virtual scene in the non-standing state.

16. The non-transitory computer-readable storage medium of claim 15, wherein the computer program instructions are executable by the at least one processor to further perform:
- receiving a posture switching instruction corresponding to the virtual object;
- controlling, according to the posture switching instruction, the virtual object to switch from the non-standing state to a standing state; and
- controlling the virtual object to automatically run in the virtual scene in the standing state.

17. The non-transitory computer-readable storage medium of claim 13, wherein the UI further includes a quick stand-up icon configured to effect a state switching of the virtual object and to control the virtual object to automatically run in the virtual scene in response to the state switching.

18. The non-transitory computer-readable storage medium of claim 17, wherein the UI further includes a drag icon, and the computer program instructions are executable by the at least one processor to further perform:
- displaying the quick stand-up icon in response to determining a distance between a center position of the drag icon and a center position of the joystick control is greater than a distance threshold.

* * * * *